(Model.) 2 Sheets—Sheet 1.

W. E. RAUH.
POCKET KNIFE.

No. 304,451. Patented Sept. 2, 1884.

WITNESSES:
A. Schehl.
Otto Risch.

INVENTOR
Wilhelm Ernst Rauh
BY Goepel & Raegener
ATTORNEYS.

(Model.)
W. E. RAUH.
POCKET KNIFE.
No. 304,451. Patented Sept. 2, 1884.
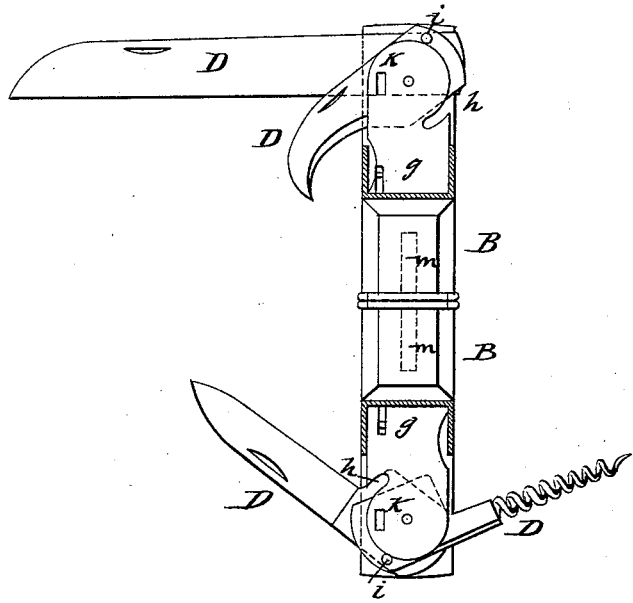
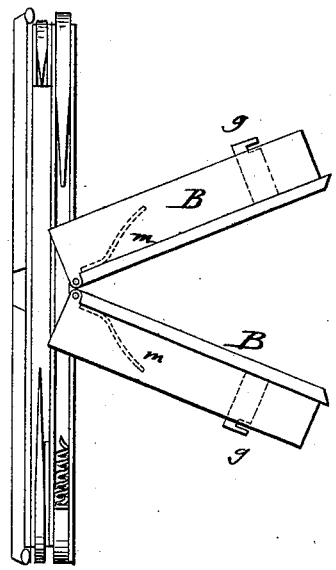
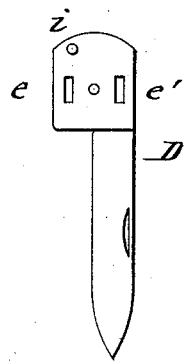
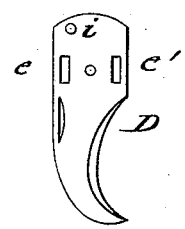
WITNESSES:
A. Schehl
Otto Risch
INVENTOR
Wilhelm Ernst Rauh
BY Goepel & Raegener
ATTORNEYS.

UNITED STATES PATENT OFFICE.

WILHELM E. RAUH, OF SOLINGEN-SCHLAGBAUM, PRUSSIA, GERMANY.

POCKET-KNIFE.

SPECIFICATION forming part of Letters Patent No. 304,451, dated September 2, 1884.

Application filed July 2, 1883. (Model.) Patented in Germany December 8, 1882, No. 25,451; in England December 9, 1882, No. 5,891; in France December 28, 1882, No. 152,847; in Belgium January 3, 1883, No. 60,067, and in Austria-Hungary February 3, 1883, No. 42,492 and No. 3,455.

*To all whom it may concern:*

Be it known that I, WILHELM ERNST RAUH, of the city of Solingen-Schlagbaum, in the Kingdom of Prussia, German Empire, have invented certain new and useful Improvements in Pocket-Knives, of which the following is a specification.

This invention has reference to certain improvements in pocket-knives, in which the different blades of the knife are inclosed and protected by a box-shaped casing against dirt and rust, and by which the blades are firmly locked into open position for use without the employment of springs or similar locking mechanism; and the invention consists of a pocket-knife having an interior blade-section and an exterior inclosing-casing, made of two parts hinged together at one end to the blade-section and connected by a locking mechanism at the other end. The blade-section is provided with means for locking the blade in open or closed position after one section of the exterior casing or box has been opened.

The invention consists, further, of certain details of construction, which will be fully described hereinafter.

Figure 1:
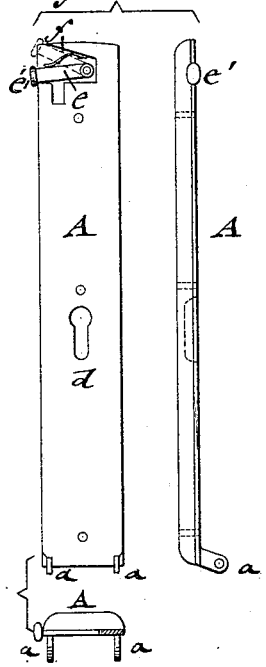
Figure 2:
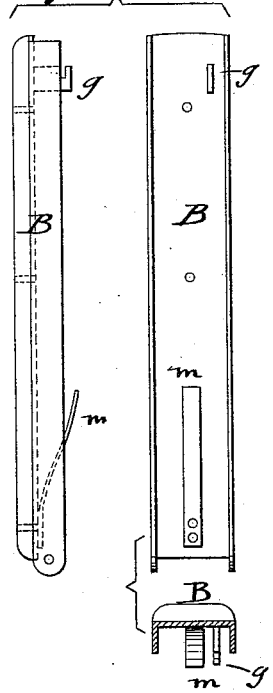
Figure 3:
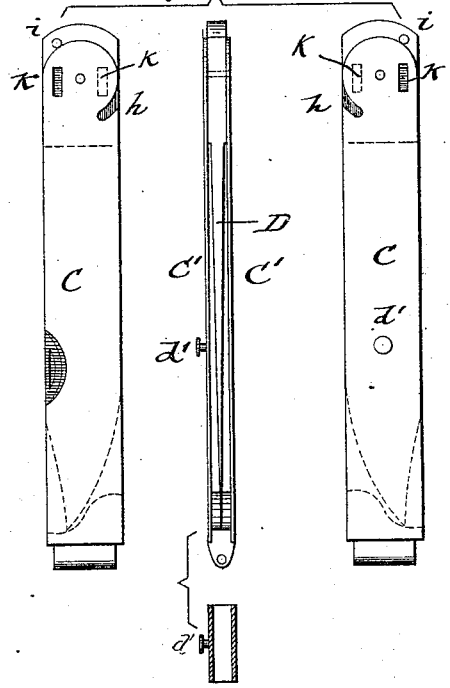
Figure 4:
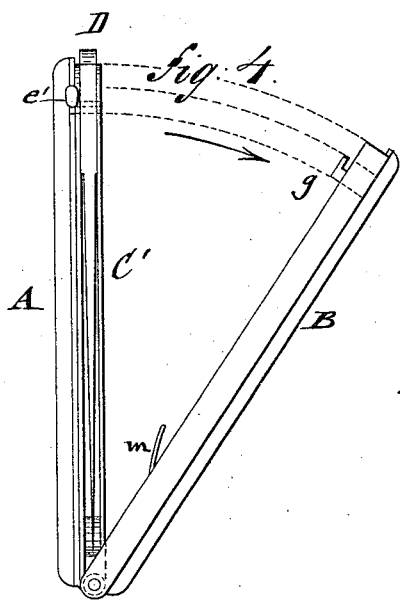
Figure 5:
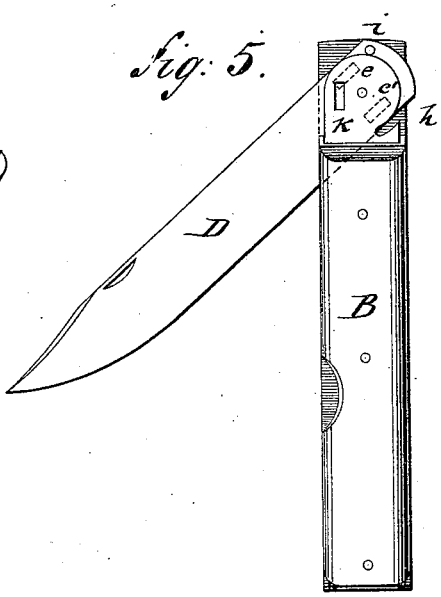

In the accompanying drawings, which fully illustrate my invention, Figures 1 and 2 represent detail side and end views of the inclosing-casing of my improved pocket-knife. Fig. 3 represents details of the blade-section; Fig. 4, a side view of a pocket-knife, with one section of the casing thrown into partly-open position, so as to open the blade. Fig. 5 is a side view of the same, showing the blade in the act of being opened. Figs. 6 and 7 represent, respectively, a sectional side view and an end view of a pocket-knife with more than one blade; and Figs. 8 and 9 are details of detached blades.

Similar letters of reference indicate corresponding parts.

Referring to the drawings, A represents the fixed section, and B the swinging section, of the box-shaped exterior casing of my improved pocket-knife. The section A is provided with perforated ears $a$ at its lower end, and the section B with holes $a'$, by which both sections are applied by a pintle to the perforated lower end of the blade-section C proper. The section A has at its middle portion a slot, $d$, that is applied to a headed pin, $d'$, of the blade-section C, whereby the former is rigidly connected to the blade-section C.

At the upper part of the box-section A is arranged a recess, into which is pivoted a locking-latch, $e$, the outer end of which is provided with an enlarged head, $e'$. This locking-latch $e$ engages a recessed lug, $g$, of the section B, and locks thereby both sections A B of the casing rigidly into closed position. When the locking-latch $e$ is released, the section B may be swung on its hinge at its lower end into open position away from the section A and blade section C. The recessed lug $g$ of the section B passes through slots $k$ of the blade-section and through slots $e$ $e'$ of the blade, so as to lock thereby the blade into open or closed position, as will more fully appear hereinafter. When a knife is arranged with more than one blade, a corresponding number of locking-latches $e$ are employed. The locking-latch $e$ may be acted upon by a spring, $f$, as shown in Fig. 1, so as to facilitate the closing of the latch.

The section B of the knife-casing is of U-shaped cross-section, as shown in Fig. 2, so that its side walls abut against the section A and form therewith a box or case that entirely incloses the blade-section C. The blade-section C consists of two brass side plates, C', to one end of which the blade D is pivoted. The ends of the side plates, C', are made of semicircular shape, the butt of the blade D being made concentric thereto and provided with a pin, $i$, that projects at both sides of the blade D and enters recesses $h$ of the side plates, C' C', said recesses being a continuation of the semicircular end portions of the side plates, C'. The recesses $e$ $e'$ of the blade D are arranged equidistantly from its pivot-pin and of equal size with the slots $k$ of the side plates, C' C'. Each side plate C' has one slot, $k$, only, the slot of one side plate serving, in connection with the recessed lug $g$ and one of the recesses of the blade, for locking the blade and its inclosing-casing into closed position, while the slot of the other side plate, the recessed lug, and the other recess of the blade serve to lock the blade D into open position.

When the knife is desired to be opened, the locking-latch $e$ is first raised and released from the lug $g$. The section B is then moved laterally away from the blade-section C, as shown in Fig. 4, the section B swinging on its hinge-connection with the section A. When the section B is in this position, the blade D is turned on its pivot until its pin $i$ arrives in the recesses $h$ of the side plates, C'. The section B is now swung on its hinge toward the section A, so that its recessed lug $g$ passes through the slots of the side plates and blade, and is re-engaged by the spring-pressed latch $e$. The blade D is in this manner locked rigidly and without the use of a retaining-spring.

To facilitate the opening of the casing A B, the hinged section B is provided at its inside with a spring, $m$, the upper free end of which presses against the blade-section C, so that when the latch $e$ is opened the section B is automatically moved by the spring $m$ away from the section A, so that the blade can be opened. To close the blade, the section B of the casing is released again from the latch $e$ and thrown laterally by the action of the spring $m$. The blade is returned between its side plates, C', and the casing closed again, as before described.

In Figs. 6 and 7 a pocket-knife is shown in which a number of blades are employed. In this case the casing is divided midway of its length into two semi-sections, which are hinged at their outer ends, the latches being operated in the same manner as before. Each blade has its own locking-latch, as will appear clearly from Figs. 6 and 7. The sections B are hinged to the middle part of the blade-section C, of which several may be arranged sidewise of each other, according to the number of blades to be provided for. The sections B are opened in the same manner as in single-bladed knives, only that one-half of the section is open at a time.

Having thus described my invention, I claim as new and desire to secure by Letters Patent—

1. A pocket-knife consisting of an interior blade-section and of an exterior inclosing-casing, composed of a fixed section applied to the blade-section, a hinged section, and means whereby the hinged section is locked to the blade and to the fixed section, substantially as and for the purpose set forth.

2. In pocket-knives, a knife-blade, D, having a rounded-off butt-end provided with slots $e\,e$ and pin $i$, that projects at both sides of the blade, in combination with the side plates, C' C', having recesses $h$ and slots $k$, whereby the blade is locked in open or closed position, substantially as described.

3. An improved pocket-knife consisting of an interior blade-section, a hinged and laterally-swinging case-section, a recessed lug, $g$, and the slots $c\,c'$ of the blade, whereby the swinging section is locked to or released from the fixed case-section, and simultaneously therewith the blade is locked into open or closed position, substantially as described.

4. The combination of the case-section A, having a locking-latch, $e$, hinged case-section B, interior blade-section, C, consisting of side plates, C' C', and blade D, the hinged section B being provided with a recessed lug, $g$, that passes through slots $k$, $e$, and $e'$ of the side plates, C', blade D, and case-section A, so as to be locked by the latch $e$ to section A, substantially as and for the purpose set forth.

In testimony that I claim the foregoing as my invention I have signed my name in the presence of two subscribing witnesses.

WILH. ERNST RAUH.

Witnesses:
CARL STAMM,
HUGO RAUH.